US012488113B2

(12) United States Patent
Lee et al.

(10) Patent No.: US 12,488,113 B2
(45) Date of Patent: Dec. 2, 2025

(54) COMPUTER SECURITY USING ZERO-TRUST PRINCIPLES AND ARTIFICIAL INTELLIGENCE FOR SOURCE CODE

(71) Applicant: PayPal, Inc., San Jose, CA (US)

(72) Inventors: Stanley Lee, Dublin, CA (US); Michelle Chance, Austin, TX (US); Dimitry Shvartsman, New York, NY (US)

(73) Assignee: PAYPAL, INC., San Jose, CA (US)

( * ) Notice: Subject to any disclaimer, the term of this patent is extended or adjusted under 35 U.S.C. 154(b) by 630 days.

(21) Appl. No.: 17/544,034

(22) Filed: Dec. 7, 2021

(65) Prior Publication Data

US 2022/0366056 A1   Nov. 17, 2022

Related U.S. Application Data

(60) Provisional application No. 63/187,239, filed on May 11, 2021.

(51) Int. Cl.
  *G06F 21/57* (2013.01)
  *G06F 8/77* (2018.01)
  *G06F 21/56* (2013.01)

(52) U.S. Cl.
  CPC .............. *G06F 21/577* (2013.01); *G06F 8/77* (2013.01); *G06F 21/563* (2013.01); *G06F 2221/033* (2013.01)

(58) Field of Classification Search
  CPC ........ G06F 21/577; G06F 8/77; G06F 21/563; G06F 2221/033
  See application file for complete search history.

(56) References Cited

U.S. PATENT DOCUMENTS

| | | | |
|---|---|---|---|
| 2018/0275989 A1* | 9/2018 | Kakkad | G06F 11/3409 |
| 2020/0311295 A1* | 10/2020 | Fox | G06F 11/362 |
| 2021/0058424 A1* | 2/2021 | Chang | G06F 11/3409 |
| 2021/0279337 A1* | 9/2021 | Mosby | G06N 20/00 |
| 2022/0108010 A1* | 4/2022 | Bishop, III | G06F 8/436 |

* cited by examiner

*Primary Examiner* — William R Korzuch
*Assistant Examiner* — Forrest L Carey
(74) *Attorney, Agent, or Firm* — Haynes and Boone, LLP

(57) ABSTRACT

Computer system security is improved by implementing zero-trust principles for management of source codes in a software development lifecycle. In some embodiments, a source code may be processed with a natural language processor to attribute the source code to its particular developer. Further, a machine learning algorithm may be applied to data related to the coding behavior of the code developer to identify any behavioral anomalies of the code developer in developing the source code. In addition, the interaction, of applications executing in an execution environment of an organization's network of managed compute facilities, with the various components of the network may be analyzed with a machine learning algorithm to identify code execution anomalies.

20 Claims, 8 Drawing Sheets

FIG. 3B

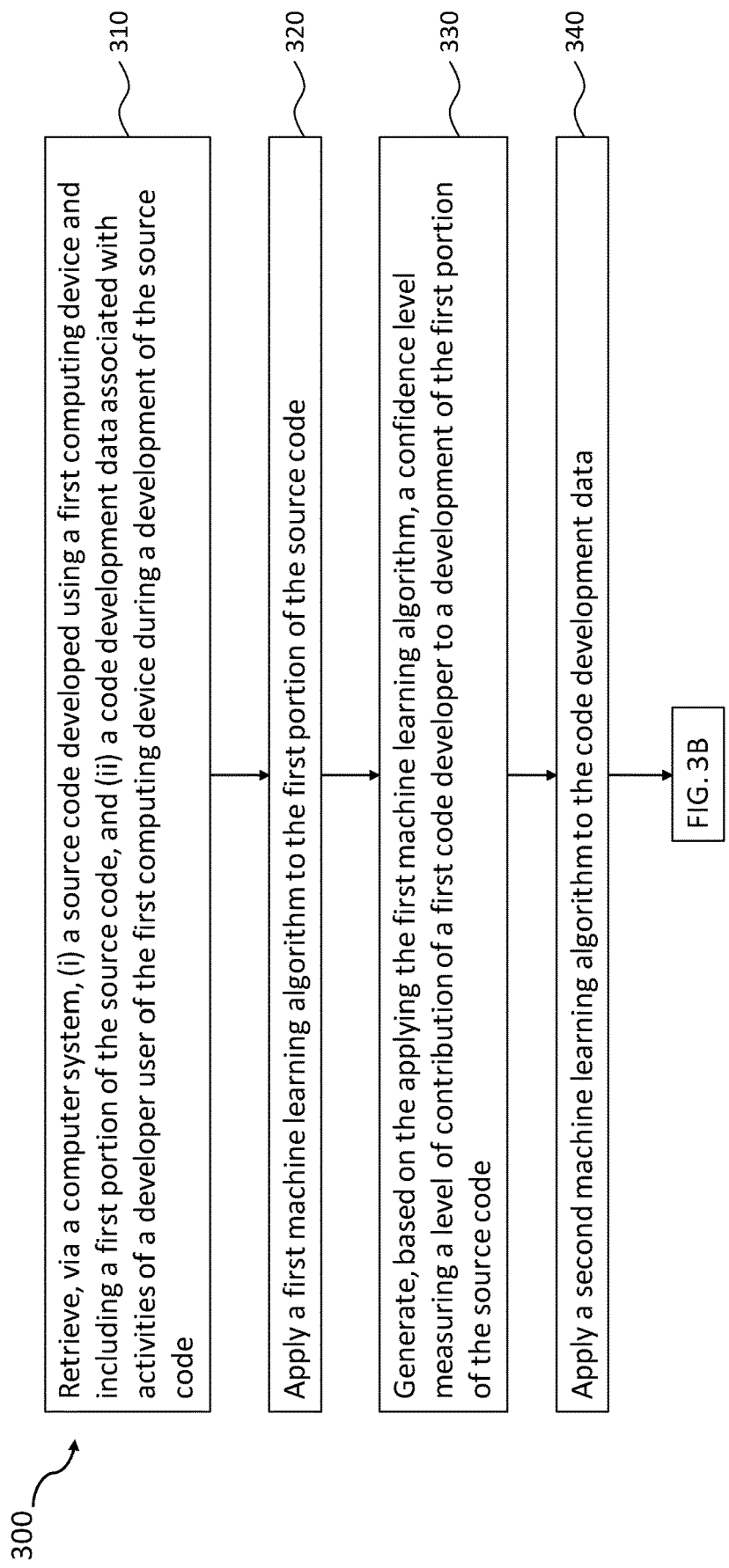

COMPUTER SECURITY USING ZERO-TRUST PRINCIPLES AND ARTIFICIAL INTELLIGENCE FOR SOURCE CODE

The present application claims priority to and the benefit of the U.S. Provisional Patent Application No. 63/187,239, filed May 11, 2021, titled "Methods and Systems for Implementing Zero-Trust Principles to Source Codes Using Artificial Intelligence," which is hereby incorporated by reference in its entirety as if fully set forth below and for all applicable purposes.

FIELD OF THE INVENTION

The present specification generally relates to computer system security, including the implementation of zero-trust principles for source codes and application executions, and more specifically, to applying artificial intelligence algorithms and techniques to identify anomalies in the development and execution of the source codes according to various embodiments.

BACKGROUND

In a zero-trust security model, persons and devices that may have access or specific privileges to a network of managed compute facilities are not trusted by default. By assuming that security breach is inevitable or may have already happened, the model allows the persons and devices least-privileged access, while running comprehensive security monitoring of the access to detect possible security breach. Currently, however, zero-trust security models do not account for security risks tied to or originating in the source codes that are executed in the network of managed compute facilities. That has resulted, for example, in source code updates being used to breach the security architecture of network systems to, in some cases, serious computer security breaches. Applicant recognizes that there is a need for improved computer security relative to source code and execution of applications originating from that source code.

BRIEF DESCRIPTION OF THE DRAWINGS

FIGS. 3A and 3B are flowcharts illustrating a method of implementing zero-trust principles to the management of source codes, according to various aspects of the present disclosure.

Figure 1:
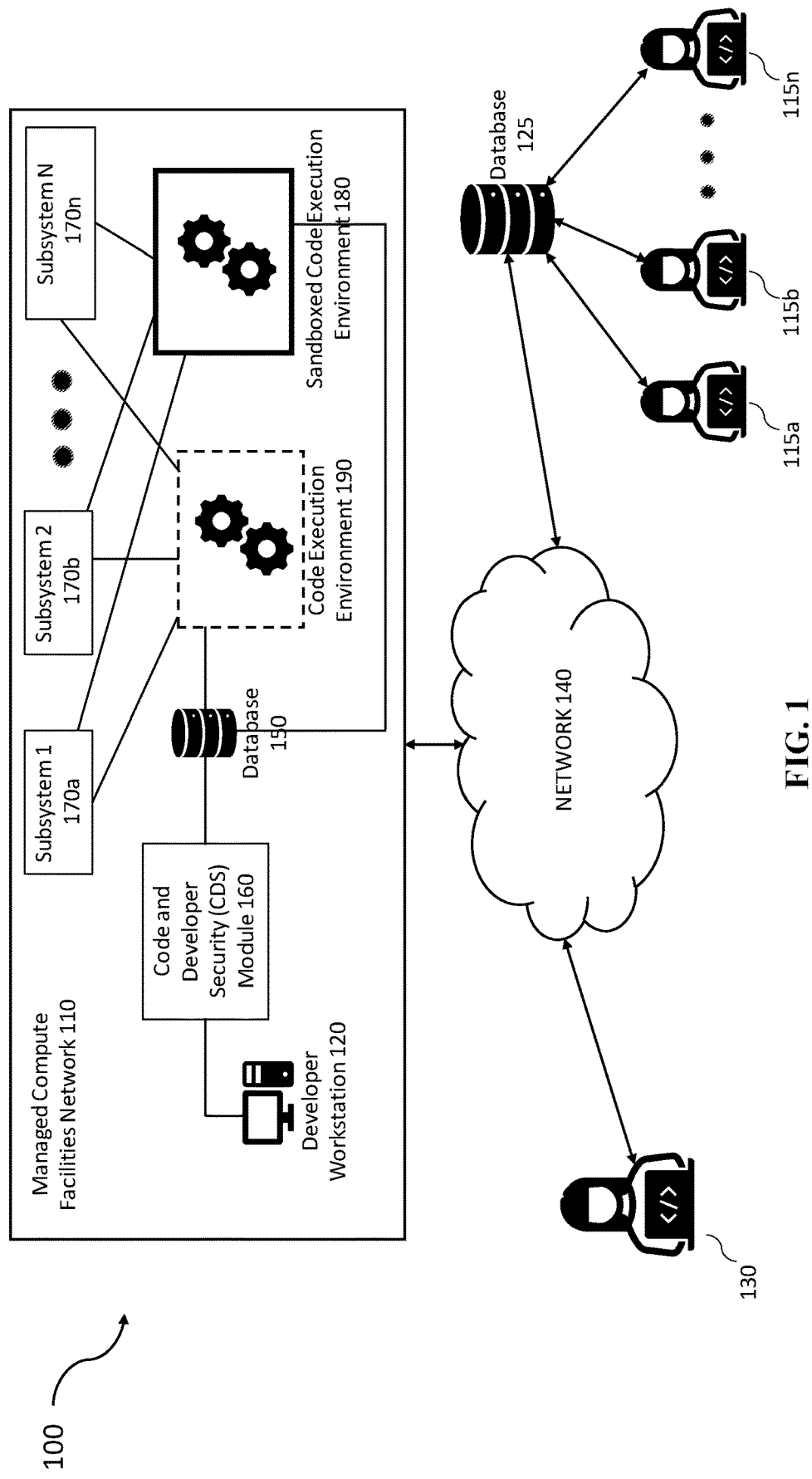
FIG. 1 is a block diagram of a networked system according to various embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to methods and systems for the implementation of zero-trust principles to the management of source codes and application executions according to various embodiments. Zero-trust principles include a set of system/network design principles with security as one of the primary goals that assume no person and device that has been granted access to a network of managed compute facilities is to be trusted, and the security of the network is to be bolstered with the continual monitoring of network activities while granting the person or device least-privileges on as-needed basis. For example, a person with credentials to access a part of the network may not be allowed to freely access other parts or the entire network using her/his computing device without further credentialing (e.g. security authentication check). As another example, the level of access the person may be granted to specific systems or data of the network may depend on the security profile of that system or data, e.g., the access granted to the person may be according to granular risk-based access control rules established based on the zero-trust principles behind the security of the network of managed compute facilities.

Current approaches to implementing zero-trust principles to secure networks of managed compute facilities, however, may still leave the networks vulnerable to security risks that come from source codes. In some cases, malicious source codes or updates to existing source codes may be introduced into a network as part of a software development lifecycle. Without zero-trust principles applied to the source codes themselves (and/or corresponding executable applications), however, the source codes may execute across the network of managed compute facilities, creating severe security risks with catastrophic consequences. For example, a code developer, to whom zero-trust principles are applied to, may deploy a source code, to which zero-trust principles are not applied to, in the network. Although the code developer may be provided least-privileged access to the network, current approaches allow the source code to execute without zero-trust security concepts applied thereto, exposing the network to security risks such as system or network backdoors that severely weaken the security of the network. As another example, an open source software, or an update thereof, may be imported into the network, and allowed to execute in the network without zero-trust security concepts applied thereto, which may weaken the security of the network by creating similar security risks.

Some embodiments of the present disclosure disclose the implementation of zero-trust principles and techniques to source codes during the software development lifecycle. That is, no source code, or updates thereof, intended for execution in a network of managed compute facilities may be trusted and the security risk to the network that may be associated with the source code may be managed with the use of artificial intelligence to identify anomalous coding behavior (of the source code developer, for instance) and code execution behaviors. In some embodiments, source codes may be analyzed using machine learning algorithms to determine or identify the author or developer of the source code, i.e., attribute the source code to one or more code developers. For example, natural language processing (NLP) algorithms can be used to identify the coding style of code developers (e.g., by training the algorithms with a training dataset of source codes/updates, including those previously developed by the code developers) and strongly attribute new source codes or source code updates to specific developers based on the results of the NLP analysis. For instance, coding styles such as but not limited to code formats, data object naming, programmatic/code structures, folder hierarchies/file naming, naming conventions, non-functional codes (e.g., embedded comments, etc.), spaces and other common meta-data, etc., may be analyzed using NLP algorithms and used to attribute source codes, or updates thereof, to specific code developers. In some instances, security risks to the network of managed compute facilities may be identified based on the attribution of the source code or update to specific developers and managed accordingly. For instance, the source codes or updates may be allowed to execute on the network or blocked from executing on the network if the code developer identified as the author/developer of the source code/update is a trusted one or not, respectively.

In some embodiments, the coding behavior of a code developer may be captured or documented as code development data and machine learning algorithms may be used on the code development data to identify coding behaviors that may be anomalies. For example, the coding behaviors of a code developer may be monitored for a fixed period to generate code development data associated with activities of the computing device of the code developer including information related to the coding behavior of the code developer when authoring source codes or updates. For instance, the code development data may include information related to the interaction of the code developer, via his/her computing device, with the various systems or components, or software development tools, of the network of managed compute facilities when developing the source codes or updates. Examples of such information related to the interactions include but are not limited to the device type or platform and/or location of the source developer's computing device during the development of the source codes/updates; date/time, frequency, and/or size of source code check-ins; branches of source codes that the code developer works with; patterns or preferences of software development tools such as open source software libraries; and/or the like.

In some instances, the code development data may be analyzed using a machine learning algorithm such as but not limited to a user behavioral analytic (UBA) machine learning algorithm to identify anomalous coding behavior of a code developer that is developing a source code or updates thereof. For example, a UBA machine learning algorithm may be trained with a training dataset of code development data related to a code developer, and the algorithm may then be used to identify anomalous coding behavior of the code developer when developing a source code/update. In some cases, the UBA machine learning algorithm may be used when monitoring the coding activities of the code developer. For instance, the algorithm may be applied to code development data obtained during the monitoring to flag as anomalous coding behaviors such as but not limited to code check-in patterns that are consistently different from those documented in the training dataset of code development data, access requests to components of the network that are not common in the training dataset, etc. In some instances, the flagged anomalous coding behavior may be further investigated to confirm the presence or absence of security risks to the network of managed compute facilities.

In some embodiments, the aforementioned training datasets of source codes/updates and/or training datasets of code development data may not be available. For example, the source code or update may be open source code or update and one may not have access to source codes previously developed by the developers of the open source codes, or code development data including information on the coding behaviors/patterns of the developers of the open source codes. In such cases, risk associated with executing a source code, or updates thereof, in the network of managed compute facilities may be evaluated by analyzing the behaviors of the code developers contributing to the development of the open source code/updates. For example, the analysis may include analysis of previously known events and behaviors, including but not limited to reputation of code contributors, last known and frequency of contribution to software developments, structural changes in the open source code between releases, etc. For example, a machine learning classifier algorithm may be trained with a training dataset related to the open source code that includes information about patterns of code developer contributions to an open source code (e.g., how often and to which types of open source codes specific code developers contribute; types of changes/updates the code developers make to open source codes when contributing, etc.) and the algorithm may then be applied to an open source code or update to identify anomalous coding behavior that warrants further investigation.

Some embodiments of the present disclosure disclose the implementation of zero-trust principles and techniques to the execution of applications including source codes in a network of managed compute facilities. That is, the execution of a source code in the network may not be trusted by default and as such the execution behavior may be monitored and analyzed to identify possible malicious execution activities that may pose security risk to the network. In some embodiments, source codes (e.g., open source codes, third-party source codes, source codes developed internally by developers employed or associated with the network of managed compute facilities, etc.) may be executed in a code execution environment of the network to establish a source code execution profile baseline to which future executions of the source code, or updates thereof, may be compared to identify source code execution anomalies. In some instances, the code execution environment may be a sandboxed code execution environment, i.e., parts of the network of managed compute facilities other than the sandboxed code execution environment may be separated or shielded from the latter such that the outputs of code executions occurring in the sandboxed code execution environment may not affect those other parts.

For example, in some instances, an open source code or an updated source code may be executed in a code execution environment of a network of managed compute facilities that may be sandboxed and the execution behavior of the code may be recorded and stored (e.g., in a database). In some instances, the execution behavior may include network internal infrastructures utilized by the code during execution (e.g., authentication/access requests), subsystems of the network the code accesses during execution (e.g., including but not limited to memory subsystems, input/output subsystems, network subsystems, kernel subsystem, disk subsystem, process managers, program validation tools, application interfaces, etc.), intermediate outputs generated, and/or the like, and such behavior may be recorded and stored as a source code execution profile baseline of the source code. In some embodiments, when the source code is executed at a later time, the execution behavior of the source code as documented at that time may be compared with the source code execution profile baseline to identify source code execution anomalies, which may then be further investigated to determine the presence of security risks to the network of managed compute facilities. As a non-limiting example, a source code or an updated may be configured to include a malicious component that is designed to run a fixed period of time after installation. In such cases, a code execution behavior of the source code documented after the fixed period of time may exhibit anomalous behavior (e.g., downloads or uploads of massive amount of data, accessing components of the network that were not accessed during the baseline execution, etc.) when compared to a source code execution profile baseline of the source code recorded prior to the expiration of the fixed time period, allowing one to identify and further investigate the anomalous behavior/ the source code to determine the existence of security risks.

In some embodiments, a machine learning algorithm such as but not limited to a machine learning classifier may be used to analyze the source code execution to identify anomalous code execution behavior. For example, in some cases, the behavior of a source code executing in the network of managed compute facilities may be recorded and stored as an execution behavioral data of the source code. For instance, the source code may interact with the various subsystems of the network including but not limited to the memory subsystem (e.g., storage, memory (e.g., random access memory (RAM), databases, particular files/folders, etc.), the network subsystem, general input/output subsystem (e.g., internal and external connections, internet/remote connections (e.g., addresses, etc.), kernel subsystem, disk subsystem, process managers, program validation tools, application interfaces, and such interactions may be documented and recorded as execution behavioral data associated with the source code. In some embodiments, the machine learning algorithm (e.g., classifier) may be trained with a training dataset of such execution behavioral data and then applied to a code execution behavioral data of the source code obtained after the source code is updated with an update. That is, in some instances, the source code may be updated with an update and the source code execution behavioral data of the updated source code while executing in a code execution environment of the network of managed compute facilities may be recorded and stored. Then, in some instances, the machine learning classifier trained on the execution behavioral data of the "non-updated" source code may be applied to the execution behavioral data of the updated source code to identify code execution behavioral anomalies of the updated source code. Examples of such anomalous source code execution behaviors may include the updated source code making calls or attempting to connect with servers not found in the execution behavioral data of the training dataset, download/uploads of massive amounts of data in excess of an amount, if any, indicated downloaded/ uploaded in the training dataset, accessing parts of the network of managed compute facilities not accessed when the training dataset was generated, and/or the like.

FIG. 1 is a block diagram of a networked system 100 according to various embodiments of the present disclosure. Networked system 100, which may be a managed compute facilities network, may comprise or implement a plurality of servers, workstations and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

In some embodiments, the networked system 100 may include a developer workstation 120, a code and developer security (CDS) module 160, a database 150, a code execution environment 190, a sandboxed code execution environment 180, and one or more subsystems 170a-170n that are in communication with computing devices of remote code developers 130 and open source code developers 115a-115n over a network 140. In some instances, the developer workstation 120, a code and developer security (CDS) module 160, a database 150, a code execution environment 190, a sandboxed code execution environment 180, and one or more subsystems 170a-170n, the computing devices of the code developer 130 and the open source code developers 115a-115n may each include or be associated with one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of networked system 100, and/or accessible over network 140. In some embodiments, the computing device of the code developer 130 may be configured to access the developer workstation 120 for developing and/or executing source codes using the developer workstation 120. In some embodiments, the computing devices of the open source code developers 115a-115n may not be configured or given access to the networked system 100, but may rather contribute to open source codes stored in the database 125 (e.g., directly or over the network 140), which may then be pulled in or imported into the networked system 100 by other entities (e.g., by the source code developer 130). In some instances, the count or number of developer workstation 120, a code and developer security (CDS) module 160, a database 150, a code execution environment 190, a sandboxed code execution environment 180, and one or more subsystems 170a-170n can be any number (e.g., different from those shown in FIG. 1).

In some embodiments, the network 140 may be implemented as a single network or a combination of multiple networks. For example, in various embodiments, network 140 may include the Internet or one or more intranets, landline networks, wireless networks, and/or other appropriate types of networks. In another example, the network 140 may comprise a wireless telecommunications network (e.g., cellular phone network) adapted to communicate with other communication networks, such as the Internet.

In some embodiments, the subsystems 170a-170n may include memory subsystems, input/output subsystems, network subsystems, kernel subsystems, disk subsystems, process managers, program validation tools, application interfaces, etc. of the networked system 100. In some instances, these subsystems may be utilized or include tools that are utilized by code developer 130 when writing or developing a source code using a computing device. For example, the subsystems 170a-170n include network connections/resources, memory/storages, databases, input/output connections, files/folders, authentication/access modules, interfaces, applications, data, servers, and/or the like that may be accessed by the computing device of the code developer 130, the developer workstation 120 which may be accessed by the computing device of the code developer 130 to write the code, the computing devices or servers of the code execution environments 190, 180, and/or the like.

In some embodiments, the code execution environments 190, 180 are a set of computing systems (e.g., servers, memory, input/output connections, etc.) that are configured for executing software applications or source codes. As noted above, the code execution environments 190, 180 may be configured to interact (e.g., make calls, send requests, etc.) to other parts of the managed compute facilities network 110 such as but not limited to the subsystems 170a-170n, the database 150, the CDS module 160, the developer workstation 120, etc., when a source code is executing therein. In some instances, the sandboxed code execution environment 180 may differ from the code execution environment 190 in that the sandboxed code execution environment 180 may be configured to not affect or alter the other parts of the networked system 100. For example, outputs of the sandboxed code execution environment 180 may not be allowed to alter the operation of any of the other components or subsystems of the networked system 100.

In some instances, a code developer 130 may use a computing device to access the developer workstation 120 of the networked system 100 over the network 140. In some instances, the code developer 130 may be accessing the developer workstation 120 to develop or author a source code (or portion thereof), or an update to the source code. In some embodiments, while coding the source code, the code developer 130 may exhibit particular coding related behaviors, patterns, and/or activities ("coding activities") that may be used to distinguish the code developer 130 from the other code developers, and as such, allow one to attribute the source code to the code developer 130. For example, the code developer 130 may have a pattern or habit related to executing source code check-ins/check-outs (e.g., the frequency of the source code check ins/outs, the locations from where, and the date/time during which, the check-ins/check outs occur, etc.).

Other examples include coding activities related to the execution of merge requests, pull requests, etc., during the development of the source code. And yet other examples include coding activities related to the code branch or modules accessed by the code developer 130 using the developer workstation 120, the types of changes that the code developer 130 makes to the source codes (e.g., new functionalities added, updates, corrections, deletions, etc.), patterns with which the code developer 130 accesses the developer workstation 120 and other components of the networked system 100 (e.g., time, frequency, types of source code development tools accessed, etc.), and/or the like. For example, in some instances, the developer workstation 120 may access developer tools and applications available in the networked system 100, and information related to the access may be considered as the coding activities of the code developer 130, such information including information about the fingerprint/identifiers of the development tools, access methods, access keys, access tokens (e.g., lifetimes), profiles of applications and data accessed, application access patterns, device fingerprints or identifiers of the devices hosting the applications, etc. Additional coding activities include authentication mechanisms used by the computing device of the code developer 130 in accessing the developer workstation 120, the time/schedule of access or log in to the developer workstation 120, the locations from where, and the date/time during which, the code developer 130 uses her/his computing device to access the developer workstation 120, etc. In some embodiments, the aforementioned coding activities may be monitored and stored in a database 150 of the networked system 100 (e.g., by the code and developer security (CDS) module 160) as the code development data of the code developer 130 related to the source code. Further, in some embodiments, the source code may also be stored in the database 150.

In some embodiments, the database 150 may also include open source code developed by code developers 115a-115n that may not have access to the networked system 100, or components therein. In some embodiments, the code developers 115a-115n may contribute to the development of an open source code stored in the database 125 and the open source code may then be imported into the networked system 100 over the network 140 for storage in the database 150 and for installation and use in the systems (e.g., developer workstation 120, code execution environments 190, 180, etc.) of the networked system 100. For instance, the code developer 130 may download the open source code from the database 125 (e.g., into the developer workstation 120 and/or the database 150) and utilize the open source code in developing source codes for execution in the networked system 100.

In some embodiments, the code and developer security (CDS) module 160 may include machine learning capabilities or functionalities configured to analyze the source code and the code development data to attribute the source code to the code developer 130 (e.g., confirm whether the code developer 130 is in fact the developer of the source code and identify code development behavioral anomalies, respectively). For example, in some embodiments, the CDS module 160 may retrieve from the database 150 the source code and the code development data having information related to the coding activities of the code developer 130. In some instances, the CDS module 160 may include a natural language processing (NLP) machine learning algorithm that is trained on a training set of source codes (e.g., at least some of which are previously developed by the code developer 130). In some embodiments, coding styles such as but not limited to folder/file/directory names and structures (e.g., hierarchies), code formats or styles (e.g., use of non-functional codes (e.g., embedded comments), function names, variable names, etc.), lines of codes created or modified, use of external libraries and dependencies, data object naming, programmatic/code structures, spaces, etc., may be used as features or inputs for the NLP machine learning algorithm. In some instances, after the NLP machine learning algorithm or model is trained with a training dataset of source codes and code development data including noted features/inputs to identify the code developer associated with the source code/code development data, the CDS module 160 may then apply the trained NLP machine learning algorithm to the source code retrieved from the database 150 to generate a confidence level that measures the level of contribution of the code developer 130 to the development of the source code.

In some embodiments, the CDS module 160 may include a user behavioral analytic (UBA) machine learning algorithm that is trained on a training set of code development data (e.g., at least some of which are related to the coding activities, using the developer workstation 120 for instance, of the code developer 130 when developing source codes) to identify anomalous coding behaviors of the code developer 130. In some instances, source code check-ins, calls to source code libraries, accesses to program management or validation tools, request to include or merge changes to source codes, etc., may be some of the features or inputs of the UBA machine learning algorithm, and the CDS module 160 may apply the trained UBA machine learning algorithm on the code development data of the code developer 130 related to the source code and retrieved from the database 150 to identify anomalous coding behaviors of the code developer 130. In some embodiments, the CDS module 160 may then apply a machine learning classifier to generate an anomaly indicator identifying a code development behavioral anomaly associated with the code developer 130 and occurring during the development of the source code. In some embodiments, the CDS module 160 may analyze the confidence level and/or the anomaly indicator and identify a security risk posed by the source code to the networked system 100. For example, the CDS module 160 may compare one or both of the confidence level and the anomaly indicator to requirements (e.g., respective thresholds) for determining presence of security risk to the networked system 100 (e.g., and identify the presence of risk if the requirements are fulfilled, for instance, if one or both of the thresholds are exceeded).

In some embodiments, the CDS module 160 may include a machine learning algorithm that is configured to generate a risk indicator for executing the open source code (e.g., developed by the code developers 115a-115n and imported into the networked system 100 and stored in the database 150) based on a reputation score of one or more of the code developers 115a-115n. Further, the risk indicator may also depend on information associated with changes made to one or more previous releases of the open source code since a previous release of the open source code identified as a trusted open source code. For example, the machine learning algorithm can be a machine learning classifier trained on a dataset including prior versions of the open source code, and the features for the machine learning algorithm may include code reputation indicators such as but not limited to open source code development maintenance history, release frequency, release notes, etc., relationship between changes in the open source codes and the open source code release notes, types of bug fixes and security patches, reputation of code developers 115a-115n, digital signatures of the code developers 115a-115n, etc., and/or the like. In some instances, the classifier may be applied to the open source code stored in the database 150 to identify open source code anomalies that may pose a risk to the security of the networked system 100. In some instances, the CDS module 160 and/or the machine learning algorithm may generate the risk indicator to indicate the presence or absence of the security risk.

In some embodiments, the NLP machine learning algorithm or module may include one or more software applications or software programs that can be automatically executed (e.g., without needing explicit instructions from a human user) to perform certain tasks. For instance, the NLP algorithm can be configured to analyze the retrieved documents and data using a counters technique, a term frequency-inverse document frequency (TF-IDF) technique, a word2vec technique, etc., to identify features that may be used in attributing the source code to the code developer 130 (e.g., generating a confidence level measuring the contribution of the code developer 130 to the development of the source code).

The details of the NLP analysis will now be discussed in more detail. As non-limiting examples, the NLP analysis may be performed using a counters technique, a term frequency-inverse document frequency (TF-IDF) technique, a word2vec technique, or combinations thereof. The counters technique, as the name suggests, counts the number of a variety of objects in the textual data obtained from a user. The objects may be words, types of words (e.g., nouns, verbs, adjectives, pronouns, adverbs, etc.), symbols (e.g., dollar sign, percentage sign, asterisk, etc.), punctuation marks, typographical errors, or even emojis. In other words, the textual data of a user may be analyzed by the counters technique to determine the number of total words, the number of nouns, the number of verbs, the number of adjectives, the number of pronouns, the number of adverbs, the number of punctuation marks, the number of symbols, the number of typographical errors, or the number of emojis. As a simplified example, the textual data may comprise, "Here is the $20 I owe you for lunch. I really enjoyed that berger. We need to do that again s000n!" Using the counters technique, the NLP algorithm may determine that there are 21 total words in the analyzed textual data, 4 pronouns, 2 typographical errors (e.g., "berger" and "s000n"), 1 symbol (e.g., the dollar sign), 3 punctuation marks, and 0 emojis.

In comparison to counters, when the TF-IDF technique is applied to the textual data of a given user, it generates a numerical statistic that reflects the importance of a word to that user, relative to other users. As such, the TF-IDF technique may be used to assign weights to different words of the user. A TF-IDF weight may be composed of two terms: TF (term frequency) and IDF (inverse document frequency). The first term (TF) computes the normalized term frequency, which may refer to the number of times a word appears in a given user's textual data, divided by the total number of words in the textual data. Expressed mathematically, TF=(number of times a particular word appears in the textual data of a user)/(total number of words in the textual data). The second term (IDF) computes, as a logarithm, the number of the users in a group of users divided by the number of users whose corresponding textual data contains the specific word. Expressed mathematically, IDF=log_e(total number of users/number of users whose textual data contains the particular word).

To illustrate TF-IDF with simplified real-world examples, a word such as "stocks" may be used frequently by many users, so even if it is also used frequently by the applicant user, it is not assigned a high weight. However, if the user is frequently using the word "NASDAQ", not only in comparison to the general population of users, but also in relation to how often the user uses words such as "stocks", "DOW", or "S&P500", then the word "NASDAQ" may be assigned a higher weight for the applicant user. This is because the frequent usage of the word "NASDAQ" according to the applicant user's language patterns indicates that it is of particular importance to the applicant user. For example, the applicant user may be more interested in trading technology stocks than stocks in general. As another example, if the word "coke" appears frequently in the applicant's textual data, it may not be weighed very heavily, since many other users may buy or consume Coke™ as well. However, if a word corresponding to a particular hair product (e.g., "L'Oreal") frequently appears in the textual data of the applicant user, it may be assigned a higher weight, because it may indicate a particular brand loyalty of the applicant user or the price range with which the applicant user is comfortable.

Word2vec is yet another way of analyzing the language usage patterns of a user. In more detail, word2vec is a neural net that processes textual data by vectorizing words. For example, an input of a word2vec process may be a body of text (e.g., a particular user's textual data aggregated over a period of time), and an output of the word2vec process may be a set of vectors, for example feature vectors that represent words in that body of text. Therefore, for a given user's textual data, each word in the textual data may have a corresponding vector, and the entirety of the textual data of that user may be represented as a vector-space.

Word2vec may be useful because it can group the vector representations of similar words together in a vector-space, for example, the words "dog" and "cat" may be closer together in vector-space than the words "dog" and "aspirin". This may be done by detecting their similarities mathematically, since mathematical operations may be performed on or using vectors. In this manner, word2vec allows mathematical processing (which is very convenient for computers) on human language data, which may make word2vec well-suited for machine learning. In a simplified example, via the application of word2vec, the words "man", "woman", "king", and "queen" may each have a respective vector representation. By subtracting the vector representation of "man" from the vector representation of "king", and then adding the vector representation of "woman", the result is the vector representation of "queen." Note that the word2vec needs to be trained for a particular context, because different words or objects may mean different things in different contexts.

In some embodiments, the CDS module 160 may include a machine learning algorithm (e.g., a machine learning classifier) that is trained on a dataset of code execution behavioral data of source codes executing in the networked system 100. For example, an application or source code may be executing in the code execution environments 190, 180, and the behavior of the code execution (e.g., the interaction of the executing source code with the other components of the networked system 100 such as but not limited to calls to the various components) may be recorded and stored in the database 150 as an execution behavioral data of the source code. For instance, the source code may interact with the various subsystems 170a-170n of the network which include but are not limited to the memory subsystem (e.g., storage, memory (e.g., random access memory (RAM), databases, particular files/folders, etc.), the network subsystem, general input/output subsystem (e.g., internal and external connections, internet/remote connections (e.g., addresses, etc.), kernel subsystem, disk subsystem, process managers, program validation tools, application interfaces. In such cases, the interactions may be documented and recorded in the database 150 as execution behavioral data associated with the source code.

In some embodiments, the machine learning classifier of the CDS module 160 may be trained with the execution behavioral data as a training dataset. For example, with respect to the interaction of the source code with the internet resource of the networked system 100, the following may be used as features (e.g., inputs) for the machine learning classifier: network baseline for connections and utilizations, host and internet protocol (IP) reputation, identifiers of malicious sites or traffics, identifiers of trusted/known traffic, types of traffic decryption and data transfer, etc. As another example, with respect to the interaction of the source code with internal applications/codes and data of the networked system 100, the following may be used as features (e.g., inputs) for the machine learning classifier: network baseline for connections and utilizations, application/code call graphs, data access model, success/fail requests or transactions by the source code, etc. And as yet another example, with respect to the interaction of the source code with internal infrastructure services of the networked system 100, the following may be used as features (e.g., inputs) for the machine learning classifier: domain name system (DNS) queries by the source code and responses thereto, authentication/access requests by the source code, software and configuration updates, dynamic host configuration protocol (DHCP) used by the source code to request internet protocol (IP) address, network time protocol (NTP) used by the source code to synchronize clocks, lightweight directory access protocol (LDAP) used by the source code used by the source code for directory services authentication, Kerberos used by the source code to manage credentials authentication, etc.

In some embodiments, the source code may be updated with an update and the source code execution behavioral data of the updated source code while executing in a code execution environment 190, 180 of the networked system 100 may be recorded and stored in the database 150. In some instances, the execution behavioral data of the updated source code may include information about interactions of the updated source code with components of the networked system 100 as described above with reference to the source code prior to updating. In some embodiments, the CDS module 160 may retrieve from the database 150 the execution behavioral data of the updated source code, the execution behavioral data of the source code prior to updating ("non-updated source code"), and apply the machine learning classifier to the execution behavioral data of the updated source code and the non-updated source code to identify an anomalous execution behavior of the updated source code. Examples of such anomalous source code execution behaviors may include the updated source code making calls or attempting to connect with servers not found in the execution behavioral data of the training dataset, download/uploads of massive amounts of data in excess of an amount, if any, indicated downloaded/uploaded in the training dataset, accessing parts of the network of managed compute facilities not accessed when the training dataset was generated, and/or the like. In some instances, the CDS module 160 may then generate a report including the identified anomalous execution behavior.

As discussed above, machine learning is used to analyze source codes, code development data related to the source codes and/or open source codes, code execution behavioral data related to the execution of the source codes to identify behavioral anomalies in the development and execution of the source codes/open source codes. Examples of the machine learning algorithms that can be used for such purposes include but are not limited to natural language processing (NLP) machine learning algorithm, user behavior analytics (UBA) machine learning algorithm, machine learning classifiers, etc. In some embodiments, machine learning may be performed at least in part via an artificial neural network, which may be used to implement the CDS module 160 of FIG. 1.

Figure 2:
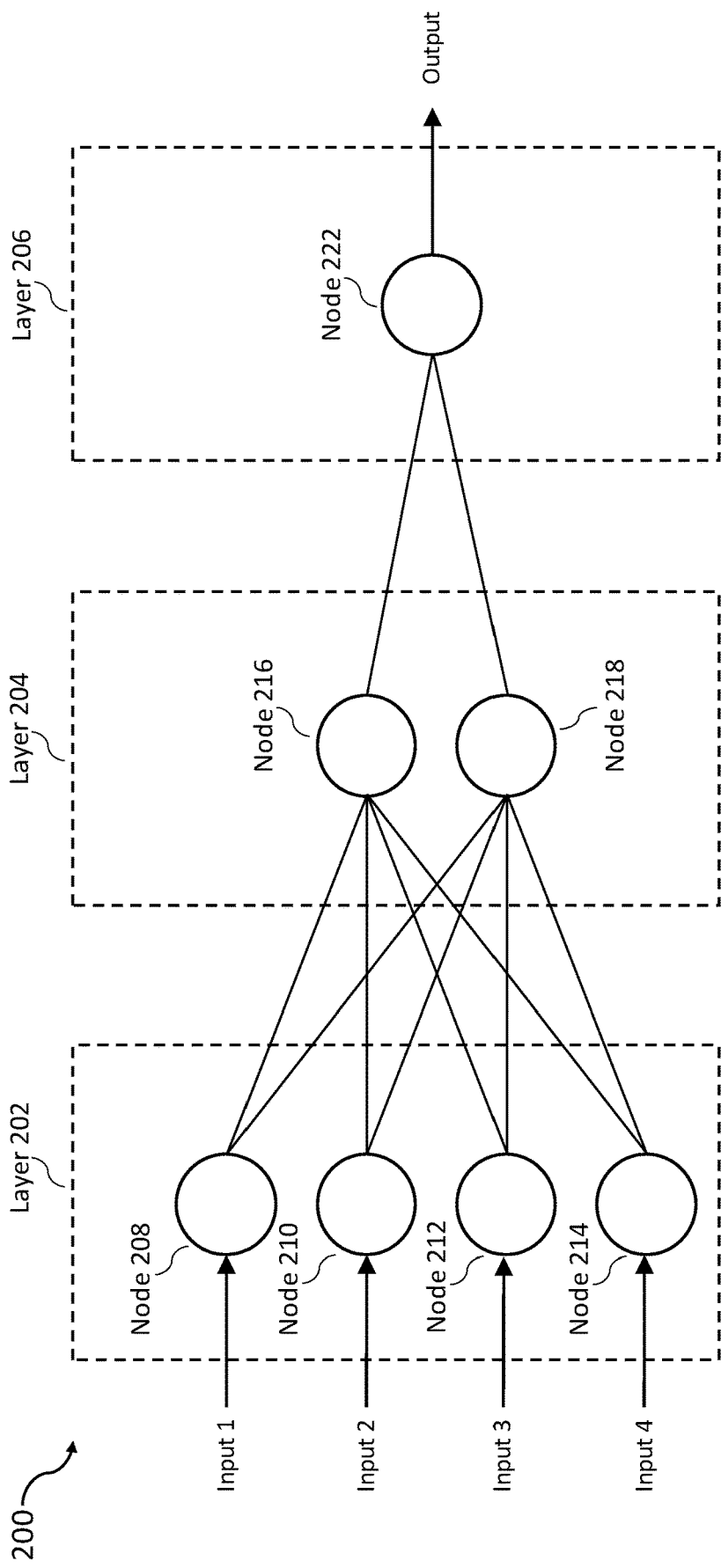
FIG. 2 illustrates an example neural network that can be used to implement a computer-based model according to various embodiments of the present disclosure.

FIG. 2 illustrates an example artificial neural network 200 that can be used to implement a computer-based model according to various embodiments of the present disclosure. As shown, the artificial neural network 200 includes three layers—an input layer 202, a hidden layer 204, and an output layer 206. Each of the layers 202, 204, and 206 may include one or more nodes. For example, the input layer 202 includes nodes 208-214, the hidden layer 204 includes nodes 216-218, and the output layer 206 includes a node 222. In this example, each node in a layer is connected to every node in an adjacent layer. For example, the node 208 in the input layer 202 is connected to both of the nodes 216, 218 in the hidden layer 204. Similarly, the node 216 in the hidden layer is connected to all of the nodes 208-214 in the input layer 202 and the node 222 in the output layer 206. Although only one hidden layer is shown for the artificial neural network 200, it has been contemplated that the artificial neural network 200 used to implement the machine learning algorithms of CDS module 160 may include as many hidden layers as necessary or desired.

In this example, the artificial neural network 200 receives a set of input values and produces an output value. Each node in the input layer 202 may correspond to a distinct input value. For example, when the artificial neural network 200 is used to implement the machine learning algorithms of CDS module 160, each node in the input layer 202 may correspond to a distinct attribute of a source code developed by a developer or a code development data.

In some embodiments, each of the nodes 216-218 in the hidden layer 204 generates a representation, which may include a mathematical computation (or algorithm) that produces a value based on the input values received from the nodes 208-214. The mathematical computation may include assigning different weights to each of the data values received from the nodes 208-214. The nodes 216 and 218 may include different algorithms and/or different weights assigned to the data variables from the nodes 208-214 such that each of the nodes 216-218 may produce a different value based on the same input values received from the nodes 208-214. In some embodiments, the weights that are initially assigned to the features (or input values) for each of the nodes 216-218 may be randomly generated (e.g., using a computer randomizer). The values generated by the nodes 216 and 218 may be used by the node 222 in the output layer 206 to produce an output value for the artificial neural network 200. When the artificial neural network 200 is used to implement the machine learning algorithms of CDS module 160, the output value produced by the artificial neural network 200 may indicate a likelihood of an event (e.g., a confidence level measuring a level of contribution of a code developer to a development of the source code, an anomaly indicator identifying a code development behavioral anomaly associated with the code developer and occurring during the development of the source code, etc.).

The artificial neural network 200 may be trained by using training data. For example, the training data herein may be previous codes developed by the code developer or the coding habits or behaviors of the code developer as documented previously. By providing training data to the artificial neural network 200, the nodes 216-218 in the hidden layer 204 may be trained (adjusted) such that an optimal output (e.g., determining a value for a threshold) is produced in the output layer 206 based on the training data. By continuously providing different sets of training data, and penalizing the artificial neural network 200 when the output of the artificial neural network 200 is incorrect (e.g., when incorrectly attributing a source code to a code developer), the artificial neural network 200 (and specifically, the representations of the nodes in the hidden layer 204) may be trained (adjusted) to improve its performance in data classification. Adjusting the artificial neural network 200 may include adjusting the weights associated with each node in the hidden layer 204.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Another example is a machine learning engine that employs a decision tree learning model to conduct the machine learning process. In some instances, decision tree learning models may include classification tree models, as well as regression tree models. In some embodiments, the machine learning engine employs a Gradient Boosting Machine (GBM) model (e.g., XGBoost) as a regression tree model. Other machine learning techniques may be used to implement the machine learning engine, for example via Random Forest or Deep Neural Networks. Other types of machine learning algorithms are not discussed in detail herein for reasons of simplicity and it is understood that the present disclosure is not limited to a particular type of machine learning.

Figure 3B:
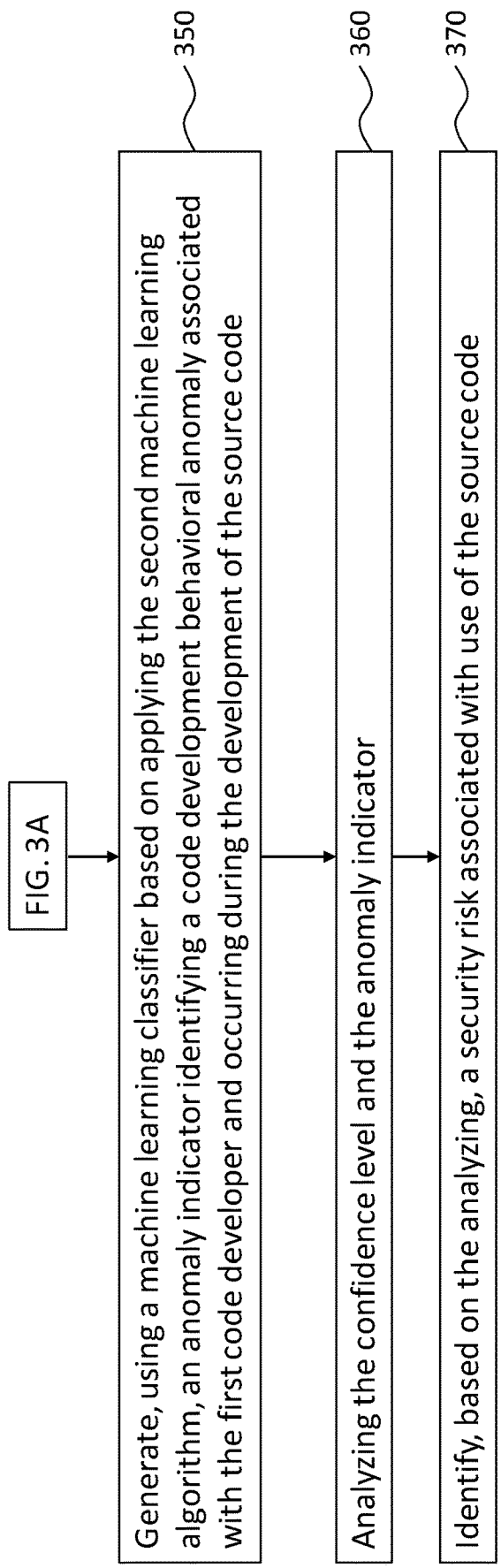

FIGS. 3A and 3B are flowcharts illustrating a method 300 of implementing zero-trust principles to the management of source codes, according to various aspects of the present disclosure. The various steps of the method 300, which are described in greater detail above, may be performed by one or more electronic processors, for example by the processors of a computer or server of a data controller transferring second-party data to a third-party (i.e., a data processor). In some embodiments, at least some of the steps of the method 300 may be performed by the processors of a computer or server implementing the code and developer security (CDS) module 160. Further, it is understood that additional method steps may be performed before, during, or after the steps 310-370 discussed below. In addition, in some embodiments, one or more of the steps 310-370 may also be omitted.

The method 300 includes a step 310 to retrieve, via a computer system, (i) a source code developed using a first computing device and including a first portion of the source code, and (ii) a code development data associated with activities of a developer user of the first computing device during a development of the source code.

The method 300 includes a step 320 to apply a first machine learning algorithm to the first portion of the source code.

The method 300 includes a step 330 to generate, based on the applying the first machine learning algorithm, a confidence level measuring a level of contribution of a first code developer to a development of the first portion of the source code.

The method 300 includes a step 340 to apply a second machine learning algorithm to the code development data.

The method 300 includes a step 350 to generate, using a machine learning classifier based on applying the second machine learning algorithm, an anomaly indicator identifying a code development behavioral anomaly associated with the first code developer and occurring during the development of the source code.

The method 300 includes a step 360 to analyze the confidence level and the anomaly indicator.

The method 300 includes a step 370 to identify, based on the analyzing, a security risk associated with use of the source code.

In some embodiments, a second portion of the source code includes an open source code developed by a second code developer using a second computing device. In such embodiments, the method 300 further comprises applying a third machine learning algorithm to the open source code; and generating, based on the third machine learning algorithm, a risk indicator indicating level of the security risk associated with executing the source code including the open source code. In some embodiments, the third machine learning algorithm is configured to generate the risk indicator based on a reputation score of the second code developer or information associated with changes made to one or more first previous releases of the open source code since a second previous release of the open source code identified as a trusted open source code. In some embodiments, the information associated with the changes include an amount of the changes, a type of the changes, a frequency of the changes, or a reputation score of a third code developer making the changes.

In some embodiments, the code development data associated with the activities of the first computing device include information about a source code check-in, a call to a particular source code library, an access to a program management or validation tool, or a request to include changes from a second portion of the source code to the first portion of the source code, occurring during the development of the source code.

In some embodiments, the first machine language algorithm is configured to generate the confidence level based on an analysis of a coding attribute of the first code developer when developing the first portion of the source code.

In some embodiments, the first machine language algorithm includes a natural language processing (NLP) machine learning algorithm.

In some embodiments, the second machine learning algorithm includes a user behavioral analytic (UBA) machine learning algorithm.

Figure 4:
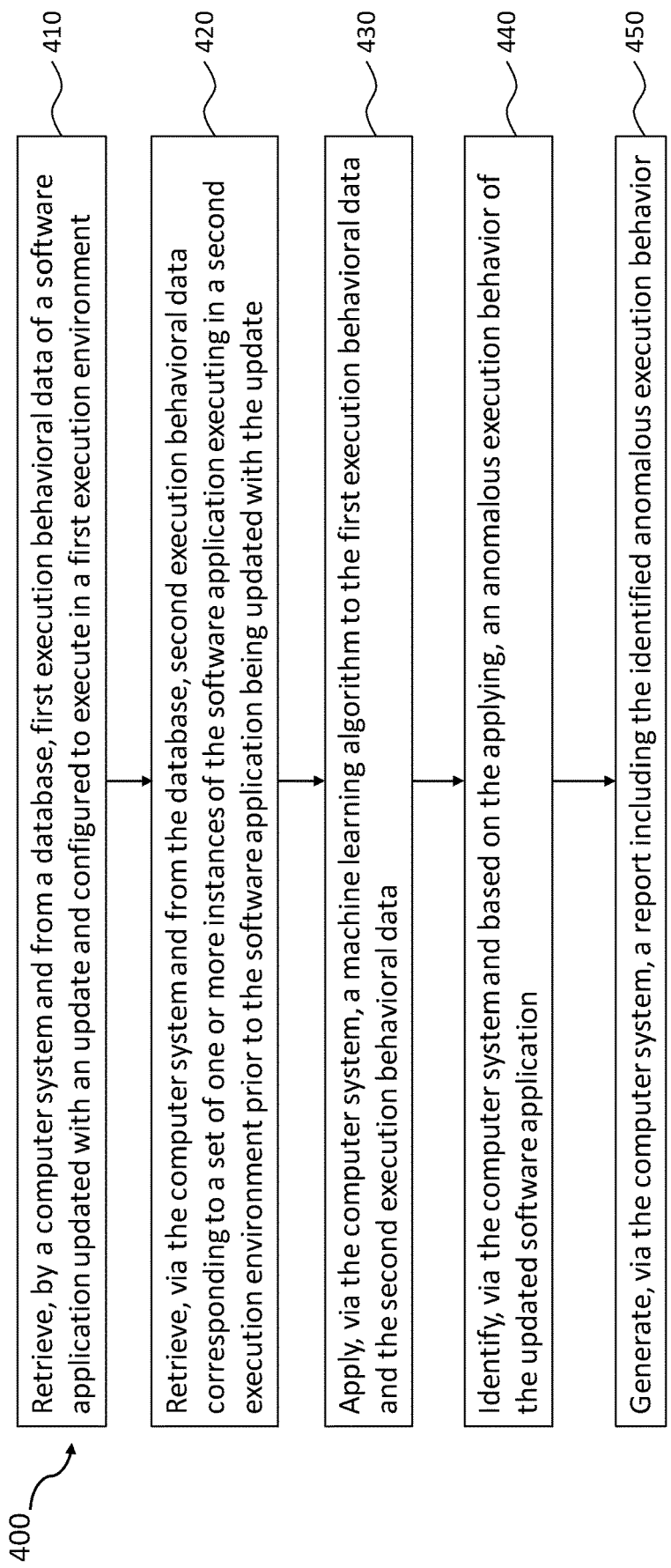
FIG. 4 is a flowchart illustrating a method of implementing zero-trust principles to the management of execution of source codes, according to various aspects of the present disclosure.

FIG. 4 is a flowchart illustrating a method 400 of implementing zero-trust principles to the management of execution of source codes in an execution environment of an organization's network of managed compute facilities, according to various aspects of the present disclosure. The various steps of the method 400, which are described in greater detail above, may be performed by one or more electronic processors, for example by the processors of a computer or server implementing the code and developer security (CDS) module 160. Further, it is understood that additional method steps may be performed before, during, or after the steps 410-450 discussed below. In addition, in some embodiments, one or more of the steps 410-450 may also be omitted.

The method 400 includes a step 410 to retrieve, by a computer system and from a database, first execution behavioral data of a software application updated with an update and configured to execute in a first execution environment. In some instances, the first execution behavioral data includes records of a first interaction of the updated software application with a first component of the first execution environment during the execution in the first execution environment.

The method 400 includes a step 420 to retrieve, via the computer system and from the database, second execution behavioral data corresponding to a set of one or more instances of the software application executing in a second execution environment prior to the software application being updated with the update. In some instances, the second execution behavioral data includes records of a second interaction of the software application with a second component of the second execution environment during the set of one or more instances of the software application executing in the second execution environment prior to the software application being updated with the update.

The method 400 includes a step 430 to apply, via the computer system, a machine learning algorithm to the first execution behavioral data and the second execution behavioral data.

The method 400 includes a step 440 to identify, via the computer system and based on the applying, an anomalous execution behavior of the updated software application.

The method 400 includes a step 450 to generate, via the computer system, a report including the identified anomalous execution behavior.

In some embodiments, the first component and/or the second component a memory subsystem, a network subsystem, or an input/output subsystem of the first execution environment and/or the second execution environment, respectively.

In some embodiments, the first interaction and/or the second interaction include a domain name system (DNS) query or an authentication or access request transmitted to the component of the first execution environment and/or the second execution environment, respectively.

In some embodiments, the machine learning algorithm includes a machine learning classifier.

In some embodiments, the method 400 further comprises executing, via the computer system, the software application, prior to being updated with the update, in a third execution environment that is sandboxed from the first execution environment or the second execution environment; and generating, via the computer system, a third execution behavioral data including records of a third interaction of the software application with the component of the first execution environment and/or the component of the second execution environment during the execution of the software application in the third execution environment.

In some embodiments, the method 400 further comprises comparing, via the computer system, the third execution behavioral data with the first execution behavioral data and/or the second execution behavioral data to identify the anomalous execution behavior of the updated software application.

In some embodiments, the first interaction and/or the second interaction of include respectively multiple first interactions and/or multiple second interactions.

In some embodiments, the first execution environment is same as the second execution environment.

Figure 5A:
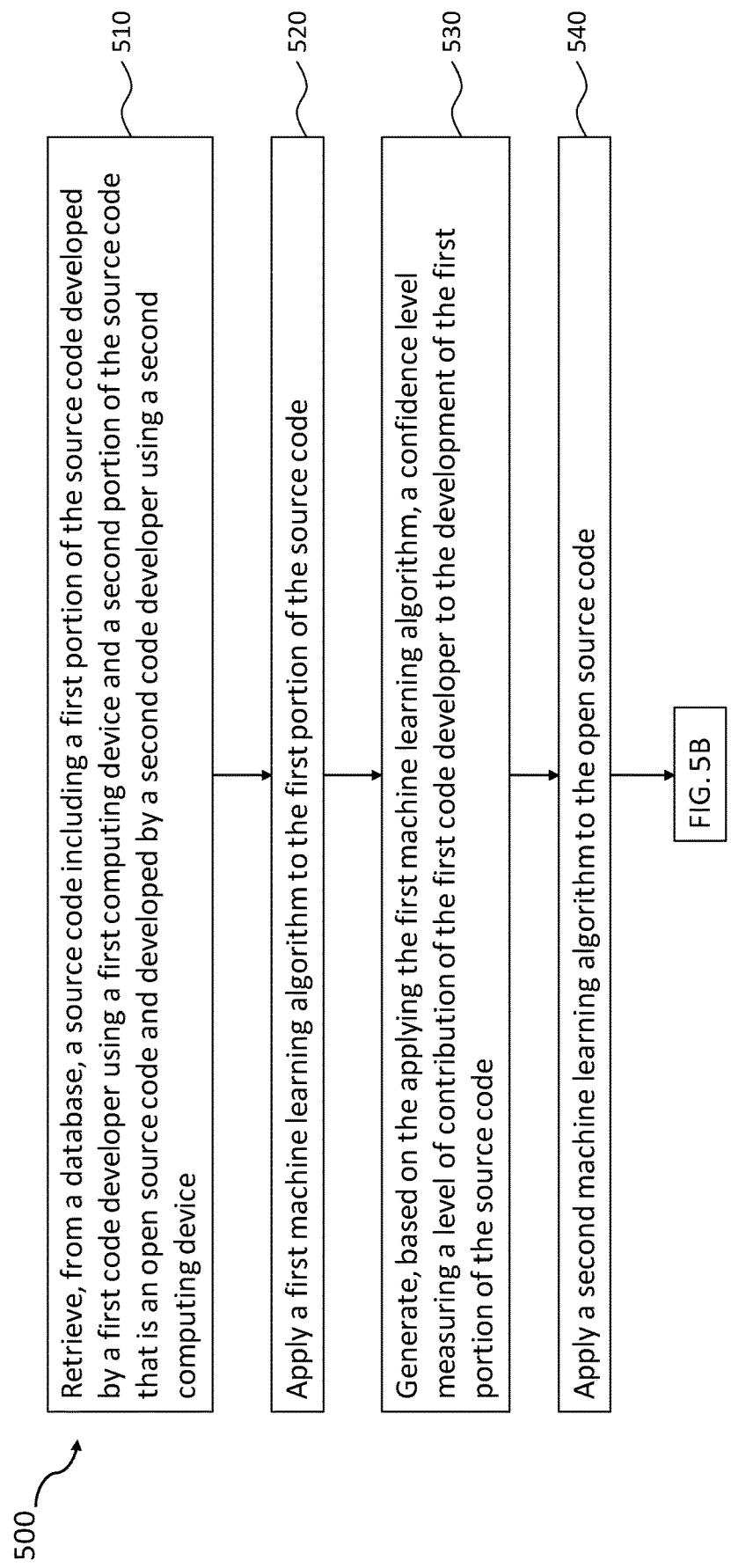
FIGS. 5A and 5B are flowcharts illustrating a method of implementing zero-trust principles to the management of execution of source codes, according to various aspects of the present disclosure.
Figure 5B:
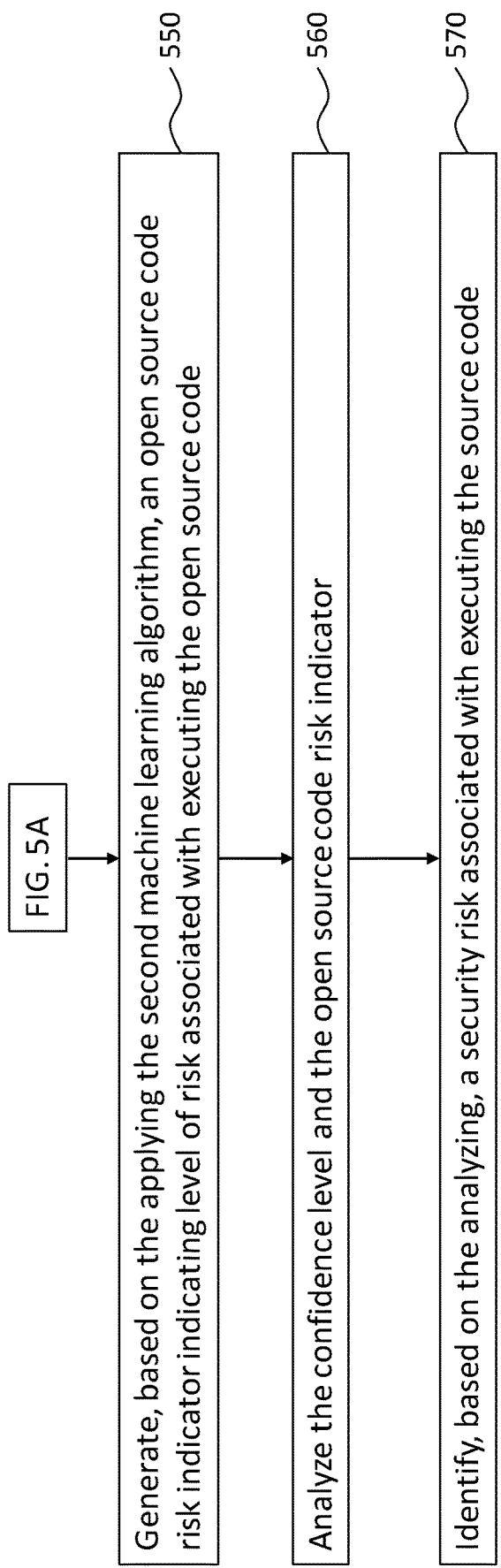

FIGS. 5A and 5B are flowcharts illustrating a method 500 of implementing zero-trust principles to the management of source codes, according to various aspects of the present disclosure. The various steps of the method 500, which are described in greater detail above, may be performed by one or more electronic processors, for example by the processors of a computer or server of a data controller transferring second-party data to a third-party (i.e., a data processor). In some embodiments, at least some of the steps of the method 500 may be performed by the processors of a computer or server implementing the code and developer security (CDS) module 160. Further, it is understood that additional method steps may be performed before, during, or after the steps 510-570 discussed below. In addition, in some embodiments, one or more of the steps 510-570 may also be omitted.

The method 500 includes a step 510 to retrieve, via the computer system and from a database, a source code including a first portion of the source code developed by a first code developer using a first computing device and a second portion of the source code that is an open source code and developed by a second code developer using a second computing device.

The method 500 includes a step 520 to apply, via the computer system, a first machine learning algorithm to the first portion of the source code.

The method 500 includes a step 530 to generate, via the computer system and based on the applying the first machine learning algorithm, a confidence level measuring a level of contribution of the first code developer to the development of the first portion of the source code.

The method 500 includes a step 540 to apply, via the computer system, a second machine learning algorithm to the open source code.

The method 500 includes a step 550 to generate, via the computer system and based on the applying the second machine learning algorithm, an open source code risk indicator indicating level of risk associated with executing the open source code.

The method 500 includes a step 560 to analyze, via the computer system, the confidence level and the open source code risk indicator.

The method 500 includes a step 570 to identify, via the computer system and based on the analyzing, a security risk associated with executing the source code.

In some embodiments, the first machine learning algorithm and/or the second machine learning algorithm include a machine learning classifier.

In some embodiments, the second machine learning algorithm is configured to generate the open source code risk indicator based on a reputation score of the second code developer or information associated with changes made to one or more first previous releases of the open source code since a second previous release of the open source code identified as a trusted open source code.

Figure 6:
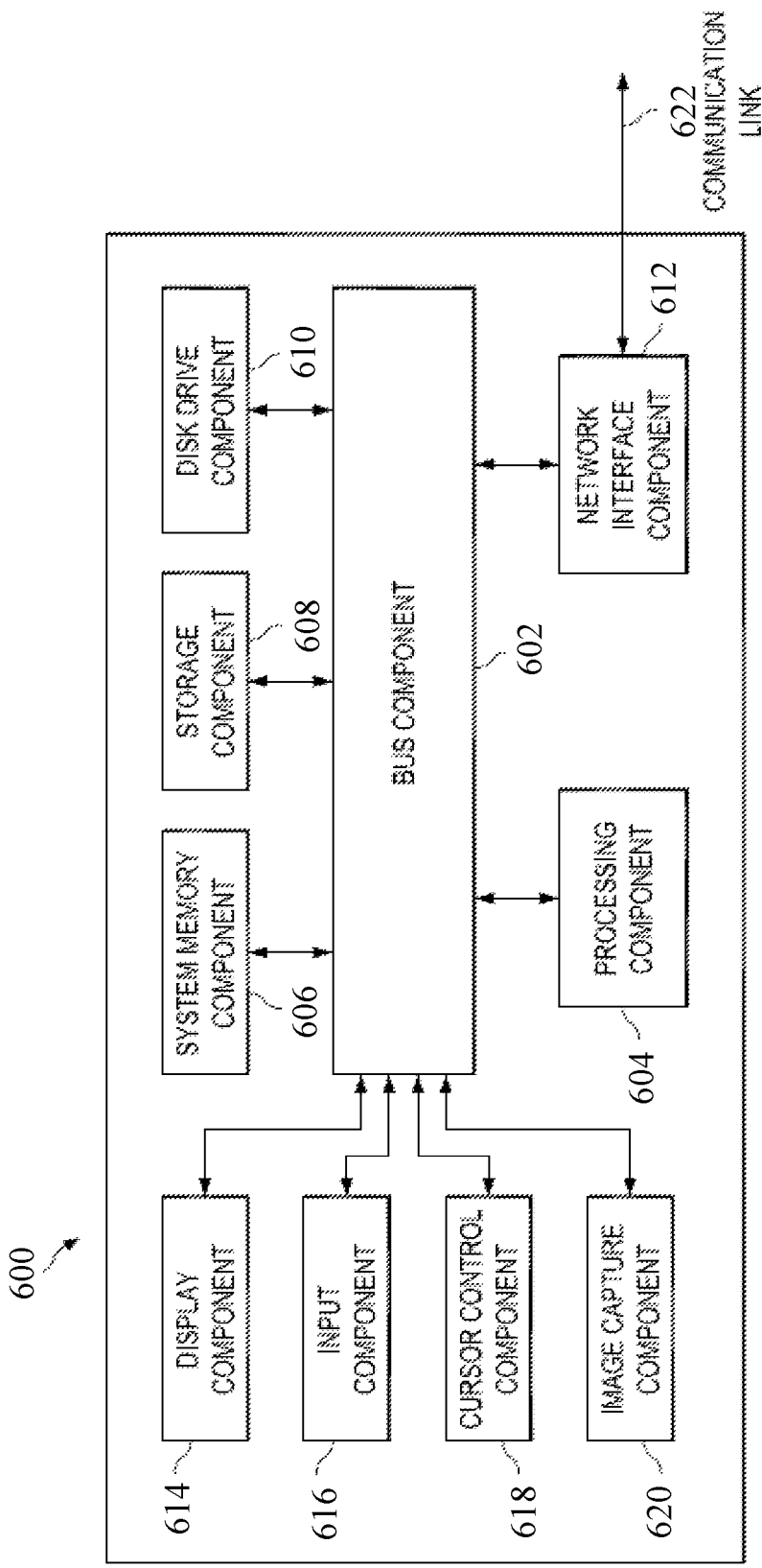
FIG. 6 is an example computer system according to various aspects of the present disclosure.

FIG. 6 is a block diagram of a computer system 600 suitable for implementing various methods and devices described herein, for example, the computing devices of code developers 130, 115a-115n, the developer workstation 120, the databases 150, 125, components of the sub systems 170a-170n (e.g., memory subsystems, network subsystems, input/output sub systems, kernel subsystems, disk subsystems, process managers, application interfaces, etc.), components of the code execution environment 190, components of the sandboxed code execution environment 180, and/or the like. In various implementations, the devices capable of performing the steps may comprise a network communications device (e.g., mobile cellular phone, laptop, personal computer, tablet, etc.), a network computing device (e.g., a network server, a computer processor, a developer workstation, an electronic communications interface, etc.), or another suitable device. Accordingly, it should be appreciated that the devices capable of implementing the aforementioned servers and modules, and the various method steps of the methods 300, 400, and 500 discussed above may be implemented as the computer system 600 in a manner as follows.

In accordance with various embodiments of the present disclosure, the computer system 600, such as a network server, a workstation, a computing device, a communications device, etc., includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure. In some embodiments, the various components of the code and developer security (CDS) module 160, the code execution environment 190, and the sandboxed code execution environment 180 may be in the form of software instructions that can be executed by the processor 604 to automatically perform context-appropriate tasks on behalf of a user.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the code developer security (CDS) module 160, the code execution environment 190, and the sandboxed code execution environment 180 discussed above.

In various embodiments of the present disclosure, execution of instruction sequences to practice the present disclosure may be performed by computer system 600. In various other embodiments of the present disclosure, a plurality of computer systems 600 coupled by communication link 622 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 622 and communication interface 612. Received program code may be executed by computer processor 604 as received and/or stored in disk drive component 610 or some other non-volatile storage component for execution. The communication link 622 and/or the communication interface 612 may be used to conduct electronic communications between the computing devices of code developer 130 and the developer workstation 120, for example.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the code developer security (CDS) module 160, the code execution environment 190, and the sandboxed code execution environment 180 may be implemented as such software code.

Recitations of Various Embodiments of the Present Disclosure

Embodiment 1: A method, comprising: retrieving, via a computer system and from a database, (i) source code developed by a first code developer using a first computing device, and (ii) code development data associated with activities of the first code developer, via the first computing device, during a development of the source code; applying, via the computer system, a first machine learning algorithm to the source code; generating, via the computer system and based on the applying the first machine learning algorithm, a confidence level measuring a level of contribution of the first code developer to the development of the source code; applying, via the computer system, a second machine learning algorithm to the code development data; generating, via the computer system and based on the applying the second machine learning algorithm, an anomaly indicator identifying a code development behavioral anomaly associated with the first code developer and occurring during the development of the source code; analyzing, via the computer system, the confidence level and the anomaly indicator; and identifying, via the computer system and based on the analyzing, a security risk associated with executing the source code.

Embodiment 2: The method of embodiment 1, wherein the source code includes an open source code developed by a second code developer using a second computing device, the method further comprising applying, via the computer system, a third machine learning algorithm to the open source code; and generating, via the computer system and based on the applying the third machine learning algorithm, an open source code risk indicator indicating a level of the security risk associated with executing the source code including the open source code.

Embodiment 3: The method of embodiment 2, wherein the third machine learning algorithm is configured to generate the risk indicator based on a reputation score of the second code developer or information associated with changes made to one or more first previous releases of the open source code since a second previous release of the open source code identified as a trusted open source code.

Embodiment 4: The method of embodiment 3, wherein the information associated with the changes include an amount of the changes, a type of the changes, a frequency of the changes, or a reputation score of a third code developer making the changes.

Embodiment 5: The method of any of embodiments 1-4, wherein the code development data include information about a source code check-in, a call to a particular source code library, an access to a program management or validation tool, or a request to include another source code into the source code, occurring during the development of the source code.

Embodiment 6: The method of any of embodiments 1-5, wherein the first machine language algorithm is configured to generate the confidence level based on an analysis of a coding behavior of the first code developer when developing the first portion of the source code.

Embodiment 7: The method of any of embodiments 1-6, wherein the first machine language algorithm includes a natural language processing (NLP) machine learning algorithm.

Embodiment 8: The method of any of embodiments 1-7, wherein the second machine learning algorithm includes a user behavioral analytic (UBA) machine learning algorithm.

Embodiment 9: The method of any of embodiments 1-8, wherein the first machine learning algorithm and/or the second machine learning algorithm include a machine learning classifier.

Embodiment 10: A method, comprising: retrieving, via a computer system and from a database, first execution behavioral data of a software application updated with an update and configured to execute in a first execution environment, the first execution behavioral data including records of a first interaction of the updated software application with a first component of the first execution environment during an execution in the first execution environment; retrieving, via the computer system, second execution behavioral data corresponding to a set of one or more instances of the software application executing in a second execution environment prior to the software application being updated with the update, the second execution behavioral data including records of a second interaction of the software application with a second component of the second execution environment during the set of one or more instances of the software application executing in the second execution environment prior to the software application being updated with the update; applying, via the computer system, a machine learning algorithm to the first execution behavioral data and the second execution behavioral data; identifying, via the computer system and based on the applying, an anomalous execution behavior of the updated software application; and generating, via the computer system, a report including the identified anomalous execution behavior.

Embodiment 11: The method of embodiment 10, wherein the first component and/or the second component include a memory subsystem, a network subsystem, or an input/output subsystem of the first execution environment and/or the second execution environment, respectively.

Embodiment 12: The method of embodiment 10 or 11, wherein the first interaction and/or the second interaction include a domain name system (DNS) query or an authentication or access request transmitted to the first component of the first execution environment and/or the second component of the second execution environment, respectively.

Embodiment 13: The method of any of embodiments 10-12, wherein the machine learning algorithm includes a machine learning classifier.

Embodiment 14: The method of any of embodiments 10-13, further comprising executing, via the computer system, the software application, prior to being updated with the update, in a third execution environment that is sandboxed from the first execution environment or the second execution environment; and generating, via the computer system, third execution behavioral data including records of a third interaction of the software application with the component of the first execution environment and/or the component of the second execution environment during the execution of the software application in the third execution environment.

Embodiment 15: The method of any of embodiments 14, further comprising: comparing, via the computer system, the third execution behavioral data with the first execution behavioral data and/or the second execution behavioral data to identify the anomalous execution behavior of the updated software application.

Embodiment 16: The method of any of embodiments 10-15, where the first interaction and/or the second interaction of include respectively multiple first interactions and/or multiple second interactions.

Embodiment 17: The method of any of embodiments 10-16, wherein the first execution environment is same as the second execution environment.

Embodiment 18: A method, comprising: retrieving, via a computer system and from a database, a source code including a first portion of the source code developed by a first code developer using a first computing device and a second portion of the source code that is an open source code and developed by a second code developer using a second computing device; applying, via the computer system, a first machine learning algorithm to the first portion of the source code; generating, via the computer system and based on the applying the first machine learning algorithm, a confidence level measuring a level of contribution of the first code developer to the development of the first portion of the source code; applying, via the computer system, a second machine learning algorithm to the open source code; generating, via the computer system and based on the applying the second machine learning algorithm, an open source code risk indicator indicating a level of risk associated with executing the open source code; analyzing, via the computer system, the confidence level and the open source code risk indicator; and identifying, via the computer system and based on the analyzing, a security risk associated with executing the source code.

Embodiment 19: The method of embodiment 18, wherein the first machine learning algorithm and/or the second machine learning algorithm include a machine learning classifier.

Embodiment 20: The method of embodiment 18 or 19, wherein the second machine learning algorithm is configured to generate the open source code risk indicator based on a reputation score of the second code developer or information associated with changes made to one or more first previous releases of the open source code since a second previous release of the open source code identified as a trusted open source code.

Embodiment 21: A system, comprising: a memory; a processor coupled to the memory and configured to, when executing instructions stored on the memory, to cause the system to perform the methods of embodiments 1-20.

Embodiment 22: A non-transitory computer-readable medium (CRM) having program code recorded thereon, the program code comprises code for causing a system to perform the methods of embodiments 1-20.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
retrieving, via a computer system and from a database, (i) source code developed by a first code developer using a first computing device, and (ii) code development data associated with activities of the first code developer, via the first computing device, during a development of the source code;
applying, via the computer system, a first machine learning algorithm of a plurality of machine learning algorithms of a module configured to assess code and developer security to the source code;
generating, via the computer system and based on the applying the first machine learning algorithm, a confidence level measuring a level of contribution of the first code developer to the development of the source code;
applying, via the computer system, a second machine learning algorithm of the plurality of machine learning algorithms to the code development data;
generating, via the computer system and based on the applying the second machine learning algorithm, an anomaly indicator identifying a code development behavioral anomaly associated with the first code developer and occurring during the development of the source code;
generating, via the computer system and based on a portion of the source code and a third machine learning algorithm of the plurality of machine learning algorithms, a risk indicator associated with executing the portion of the source code separate from other portions of the source code based on a reputational score associated with the portion of the source code;

analyzing, via the computer system, the source code for a security risk based on a combination, generated by the plurality of machine learning algorithms, of at least the confidence level, the anomaly indicator, and the risk indicator;

identifying, via the computer system and based on the analyzing, the security risk associated with executing the source code;

executing the source code in a first execution environment that is different from a second execution environment;

generating, via the computer system, execution behavioral data including a record of an interaction of the source code with a software component based on the executing;

establishing, via the computer system, an execution profile baseline for the source code based on the execution behavioral data; and monitoring, via the computer system, the source code for an execution anomaly that deviates from the execution profile baseline when the source code is executed in the second execution environment.

2. The method of claim 1, wherein the source code includes an open source code developed by a second code developer using a second computing device, and wherein the generating the risk indicator comprises:

applying, via the computer system, the third machine learning algorithm to the open source code; and generating, via the computer system and based on the applying the third machine learning algorithm, the risk indicator indicating a level of the security risk associated with executing the source code including the open source code.

3. The method of claim 2, wherein the third machine learning algorithm is configured to generate the risk indicator based on a reputation score of the second code developer or information associated with changes made to one or more first previous releases of the open source code since a second previous release of the open source code identified as a trusted open source code.

4. The method of claim 3, wherein the information associated with the changes include an amount of the changes, a type of the changes, a frequency of the changes, or a reputation score of a third code developer making the changes.

5. The method of claim 1, wherein the code development data include information about a source code check-in, a call to a particular source code library, an access to a program management or validation tool, or a request to include another source code into the source code, occurring during the development of the source code.

6. The method of claim 1, wherein the first machine language algorithm is configured to generate the confidence level based on an analysis of a coding behavior of the first code developer when developing the first portion of the source code.

7. The method of claim 1, wherein the first machine learning algorithm includes a natural language processing (NLP) machine learning algorithm.

8. The method of claim 1, wherein the second machine learning algorithm includes a user behavioral analytic (UBA) machine learning algorithm.

9. The method of claim 1, wherein the first machine learning algorithm and/or the second machine learning algorithm include a machine learning classifier.

10. A system comprising:

a non-transitory memory; and one or more hardware processors coupled to the non-transitory memory and configured to execute instructions to cause the system to:

retrieve, from a database, (i) source code developed by a first code developer using a first computing device, and (ii) code development data associated with activities of the first code developer, via the first computing device, during a development of the source code;

apply a first machine learning algorithm to the source code;

generate, based on the applying the first machine learning algorithm, a confidence level measuring a level of contribution of the first code developer to the development of the source code;

apply a second machine learning algorithm to the code development data;

generate, based on the applying the second machine learning algorithm, an anomaly indicator identifying a code development behavioral anomaly associated with the first code developer and occurring during the development of the source code;

generate, via the computer system and based on a portion of the source code and a third machine learning algorithm of the plurality of machine learning algorithms, a risk indicator associated with executing the portion of the source code separate from other portions of the source code based on a reputational score associated with the portion of the source code;

analyze, via the computer system, the source code for a security risk based on a combination, generated by the plurality of machine learning algorithms, of at least the confidence level, the anomaly indicator, and the risk indicator;

identify, based on analyzing the confidence level, the security risk associated with executing the source code;

execute the source code in a first execution environment that is isolated from a second execution environment;

generate execution behavioral data including a record of an interaction of the source code with a software component based on executing the source code in the first execution environment; and outputting an indicator of the security risk based on the execution behavioral data and anomalous code behaviors associated with past source code anomalies.

11. The system of claim 10, wherein the source code includes an open source code developed by a second code developer using a second computing device, and wherein executing the instructions further cause the system to:

apply, via the system, a third machine learning algorithm to the open source code; and generate, via the system and based on the applying the third machine learning algorithm, an open source code risk indicator indicating a level of the security risk associated with executing the source code including the open source code.

12. The system of claim 11, wherein the third machine learning algorithm is configured to generate the risk indicator based on a reputation score of the second code developer or information associated with changes made to one or more first previous releases of the open source code since a second previous release of the open source code identified as a trusted open source code.

13. The system of claim 12, wherein the information associated with the changes include an amount of the changes, a type of the changes, a frequency of the changes, or a reputation score of a third code developer making the changes.

14. The system of claim 10, wherein the code development data include information about a source code check-in, a call to a particular source code library, an access to a program management or validation tool, or a request to include another source code into the source code, occurring during the development of the source code.

15. The system of claim 10, wherein the first machine language algorithm is configured to generate the confidence level based on an analysis of a coding behavior of the first code developer when developing the first portion of the source code.

16. The system of claim 10, wherein the first machine learning algorithm includes a natural language processing (NLP) machine learning algorithm.

17. The system of claim 10, wherein the second machine learning algorithm includes a user behavioral analytic (UBA) machine learning algorithm.

18. The system of claim 10, wherein the first machine learning algorithm and/or the second machine learning algorithm include a machine learning classifier.

19. A non-transitory machine-readable medium having stored thereon machine-readable instructions executable to cause a machine to perform operations comprising:
   retrieving, via a computer system and from a database, (i) source code developed by a first code developer using a first computing device, and (ii) code development data associated with activities of the first code developer, via the first computing device, during a development of the source code;
   applying, via the computer system, a first machine learning algorithm to the source code;
   generating, via the computer system and based on the applying the first machine learning algorithm, a confidence level measuring a level of contribution of the first code developer to the development of the source code;
   applying, via the computer system, a second machine learning algorithm to the code development data;
   generating, via the computer system and based on the applying the second machine learning algorithm, an anomaly indicator identifying a code development behavioral anomaly associated with the first code developer and occurring during the development of the source code;
   generating, via the computer system and based on a portion of the source code and a third machine learning algorithm of the plurality of machine learning algorithms, a risk indicator associated with executing the portion of the source code separate from other portions of the source code based on a reputational score associated with the portion of the source code;
   analyzing, via the computer system, the source code for a security risk based on a combination, generated by the plurality of machine learning algorithms, of at least the confidence level, the anomaly indicator, and the risk indicator;
   identifying, via the computer system and based on the analyzing, security risk associated with executing the source code;
   executing the source code in a first execution environment that is separated from a second execution environment;
   generating, via the computer system, execution behavioral data including a record of an interaction of the source code with a software component based on the executing; and
   generating, via the computer system, a report of an anomaly in the source code deviating from the execution behavioral data at a later time after the source code is being executed in the second execution environment.

20. The non-transitory machine-readable medium of claim 19, wherein the source code includes an open source code developed by a second code developer using a second computing device, and wherein the operations further comprise:
   applying, via the computer system, a third machine learning algorithm to the open source code; and
   generating, via the computer system and based on the applying the third machine learning algorithm, an open source code risk indicator indicating a level of the security risk associated with executing the source code including the open source code.

* * * * *